(12) United States Patent
Borovoy et al.

(10) Patent No.: US 7,769,741 B2
(45) Date of Patent: Aug. 3, 2010

(54) PORTABLE BROWSING INTERFACE FOR INFORMATION RETRIEVAL

(75) Inventors: Richard Daniel Borovoy, Boston, MA (US); Michael Graves, San Jose, CA (US); Michael Robert Hanson, Menlo Park, CA (US); Nagabhushan Rao Machiraju, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/611,252

(22) Filed: Nov. 3, 2009

(65) Prior Publication Data

US 2010/0063964 A1   Mar. 11, 2010

Related U.S. Application Data

(63) Continuation of application No. 10/406,439, filed on Apr. 4, 2003, now Pat. No. 7,613,684, which is a continuation of application No. 10/150,086, filed on May 20, 2002, now Pat. No. 6,574,620, which is a continuation of application No. 09/176,116, filed on Oct. 21, 1998, now Pat. No. 6,418,429.

(51) Int. Cl.
G06F 17/30 (2006.01)

(52) U.S. Cl. .................................... 707/706

(58) Field of Classification Search ................ 707/706, 707/716, 727, 752, 797, 829
See application file for complete search history.

(56) References Cited

U.S. PATENT DOCUMENTS

| | | | |
|---|---|---|---|
| 5,642,518 A | | 6/1997 | Kiyama et al. |
| 6,070,164 A | | 5/2000 | Vagnozzi |
| 6,094,649 A | * | 7/2000 | Bowen et al. .................... 1/1 |
| 6,212,512 B1 | | 4/2001 | Barney et al. |
| 6,236,987 B1 | | 5/2001 | Horowitz et al. |
| 6,414,429 B2 | | 7/2002 | Watkins et al. |
| 6,418,429 B1 | | 7/2002 | Borovoy et al. |
| 6,480,857 B1 | * | 11/2002 | Chandler ......................... 1/1 |
| 6,567,812 B1 | * | 5/2003 | Garrecht et al. ................. 1/1 |
| 2003/0074369 A1 | | 4/2003 | Schuetze et al. |
| 2006/0053142 A1 | | 3/2006 | Sebbane |
| 2007/0203892 A1 | * | 8/2007 | Adams et al. .................. 707/3 |
| 2008/0263009 A1 | | 10/2008 | Buettner et al. |
| 2009/0006427 A1 | * | 1/2009 | Veeraraghavan et al. .... 707/100 |

* cited by examiner

*Primary Examiner*—Diane Mizrahi
(74) *Attorney, Agent, or Firm*—Buchanan Ingersoll & Rooney PC

(57) ABSTRACT

An integrated searching/browsing mechanism employs user-constructed information hierarchies that represent a cognitive framework for the organization of information. The hierarchies are independent of the information itself. This feature permits them to be shared among multiple users, and applied to any of a variety of different sources of information. The hierarchical organization that is provided by the framework gives the user the ability to browse around any available document database in a manner that is intuitive to the user. Two or more hierarchies can be combined to locate documents which match the criteria of both hierarchies, and thereby refine search results to an appropriate level. A relevance feedback mechanism further enhances the browsing experience, by concentrating the search results in areas that are most relevant to documents selected as being of particular interest.

23 Claims, 5 Drawing Sheets

PORTABLE BROWSING INTERFACE FOR INFORMATION RETRIEVAL

CROSS REFERENCE TO RELATED APPLICATION

This application is a continuation of application Ser. No. 10/406,439, filed Apr. 4, 2003, now U.S. Pat. No. 7,613,684, issued Nov. 3, 2009, which is a continuation application of application Ser. No. 10/150,086, filed May 20, 2002, now U.S. Pat. No. 6,574,620, issued Jun. 3, 2003, which is a continuation application of application Ser. No. 09/176,116, filed Oct. 21, 1998, now U.S. Pat. No. 6,418,429, issued Jul. 9, 2002.

FIELD OF THE INVENTION

The present invention is directed to information retrieval systems, and more particularly to an integrated searching/browsing retrieval system that combines the functionality of a full-text search engine with the flexibility of a browser.

BACKGROUND OF THE INVENTION

As greater amounts of information continue to be stored on, and accessed by, computerized information services, mechanisms which enable a user to locate and review information of interest become a critical component of an information retrieval system. Typically, one of two different types of mechanisms is employed by users to access documents that are relevant to their needs or interests. One such mechanism is the hierarchical browser, which permits the user to view groups of documents and identify the documents within the context in which they are stored. If a document of interest is located, related documents can be easily found as well, because the user is provided with the ability to look in areas surrounding the document of interest to see other documents that are stored with it. Hierarchical browsers are essentially one dimensional, in that a single tree-like structure is provided for navigating among documents. This mechanism may be acceptable for single-user systems, in which the user authored the hierarchy. However, in multi-user systems, such as news databases, help lines, work group databases, and the like, not all users may find the single hierarchy to be cognitively intuitive, and therefore may have difficulty navigating through the hierarchy to find documents of interest.

The other type of retrieval mechanism, namely a full-text search engine, permits users to enter queries, and respond to those queries by returning document titles. These titles may be accompanied by relevance rankings or other indicators of the degree to which each document corresponds to the query. The document titles are typically presented to the user in the form of a list that may be sorted by relevance rankings, and do not provide any information regarding the context of the documents in the full database of information. Furthermore, they do not give the user the ability to browse through the spaces that are occupied by the listed documents, to locate related documents which were not selected as a result of the query. Such systems tend to work best for users who are looking for specific information, and they require a certain level of skill in constructing appropriate queries, since the results are highly dependent upon the terms which the user employs as an expression of interest.

It is an objective of the present invention to provide a document retrieval mechanism that offers the functionality of a full-text search engine, to enable a user to readily identify documents meeting that user's criteria, while at the same time offering the flexibility of a browser, to permit the user to locate related documents that may not match a specific query but which may nevertheless be of interest to the user.

SUMMARY OF THE INVENTION

In accordance with the foregoing objective, the present invention provides an integrated searching/browsing mechanism that enables users to construct information hierarchies that represent a cognitive framework for the organization of information, and to apply those hierarchies to any database of information. With this approach, the user is provided with the ability to navigate any available document database in a manner that is intuitive to that user. Furthermore, a user can combine two or more hierarchies to locate documents which match the criteria of both hierarchies, to further refine the collection of documents that are presented to the user. A significant feature of this approach is that the hierarchies can be constructed and applied independently of any particular document collection.

The information retrieval system of the invention is comprised of three main components. Dimension files represent information hierarchies constructed by users. A search and indexing system indexes information and returns lists of documents in accordance with the hierarchical structure defined in the dimension files. A user interface enables the user to specify the information to be retrieved, and provides the user with the ability to browse through various hierarchical levels of information. A system comprised of these components can be applied to a variety of different sources of information.

The system of the present invention enables users to view any collection of documents via a cognitive framework, as represented by browser hierarchies, which is useful, meaningful and comfortable to the users. It also permits the users to switch from one browser hierarchy to another, or to combine hierarchies in a single browsing experience. As a result, the user is able to browse over independent document collections, rather than being required to perform targeted searches that may limit the information presented to the user.

Further features of the invention, as well as the advantages achieved thereby, are described in detail hereinafter with reference to an embodiment illustrated in the accompanying drawings.

DETAILED DESCRIPTION

The following description of the invention is made with reference to specific embodiments, to facilitate an understanding of the features and principles of the invention. For instance, examples of search hierarchies are given with respect to categories of products in which a user might be interested. It will be appreciated, however, that these specific examples are merely illustrative of one application of the invention, and that the features of the invention have a broad range of applicability to a variety of different types of information, and different categorizations of that information.

Figure 1:
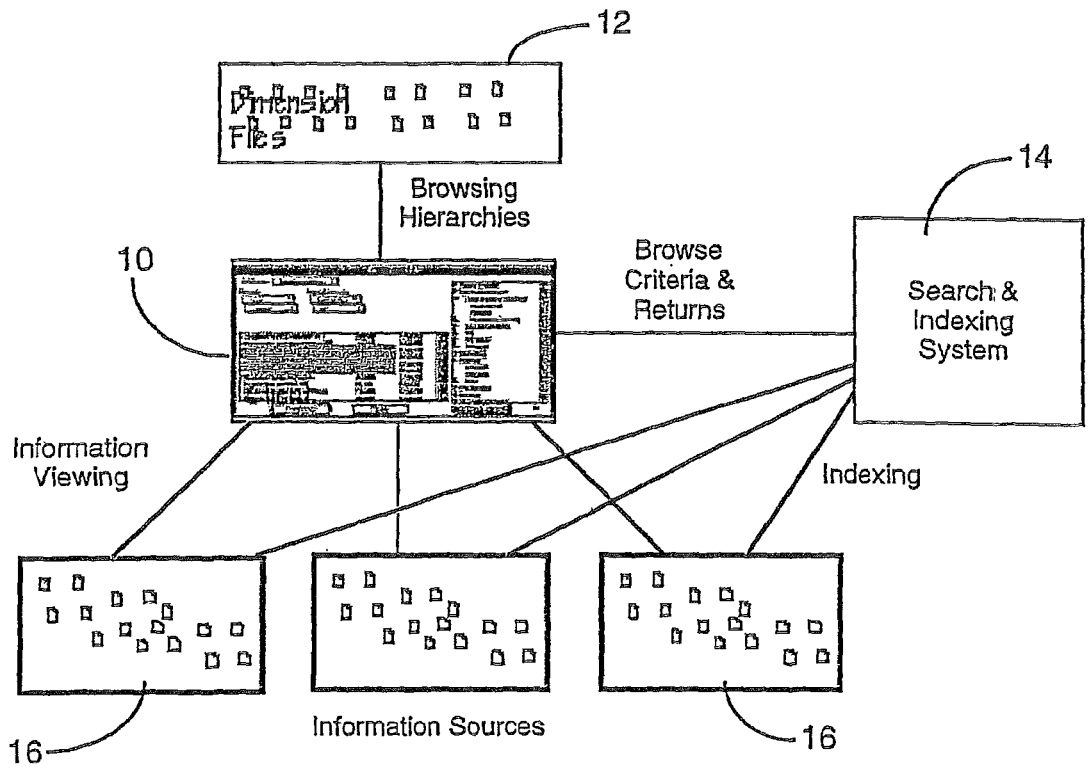
FIG. 1 is a general block diagram of an embodiment of an information retrieval system in accordance with the present invention.

An embodiment of an information retrieval system which is based upon the principles of the present invention is illustrated in the block diagram of FIG. 1. The three main components of the system comprise a client application 10, one or more dimension files 12, and a search and indexing system 14. These components interact with one or more information sources 16, such as news databases, on-line product catalogs, help files, etc., to present documents of interest to the user. In the context of the present invention, the term "document" connotes any searchable quantum of data that is presented to the user as a unit of information. Thus, for example, a document could be a conventional text file, a graphics image, an FTP file, etc.

The client application 10 executes on the user's computer (not shown). Preferably, this application is stored together with the dimension files on a suitable computer-readable medium associated with that computer, e.g. a magnetic disk. The search and indexing system 14 could also be running on the user's computer, or on a different computer to which the user's computer is connected, such as a network server. The information sources 16 might also be stored on the user's computer, but more typically would be associated with one or more servers to which the user's computer is connected.

The dimension files 12 represent browsing hierarchies that define the relationship between various search criteria, in a manner that is comprehensible to the user. The hierarchies represented by the dimension files can be created by the users themselves, as described in detail hereinafter, or they can be preexisting hierarchies having a structure about which the user is knowledgeable.

The client application 10 provides the interface via which the user selects one or more browser hierarchies from the dimension files 12, as well as the information sources 16 that are to be examined for documents of interest. The search and indexing system 14 constructs an index of each of the information sources 16, in a known manner. The search and indexing system can be any suitable conventional type of search engine that is capable of accepting compound boolean requests. Once a user has selected one or more information sources to be searched and the appropriate browser hierarchies to be employed in searching the information, the search and indexing system 14 returns a list of the documents which meet the browsing criteria. These returned documents are then displayed to the user via the interface provided by the client 10.

Figure 2:
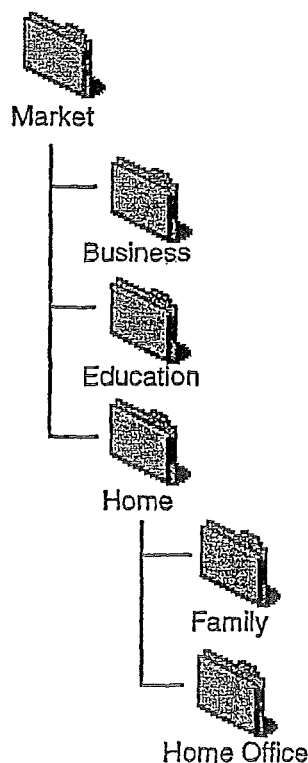
FIG. 2 is an example of a hierarchical structure of folders that is used to create a dimension file.

Each dimension file 12 corresponds to a browser having a structure that represents various levels of information in a hierarchical relationship that is determined by the user's personal preferences regarding the organization and content of information. In a preferred embodiment of the invention, the user can construct a browser hierarchy by creating a series of empty, nested folders within the graphical user interface of a computer's operating system. One example of such a user interface is the Finder component of the Macintosh Operating System, distributed by Apple Computer, Inc. By means of such an interface, the user can create a series of folders that are nested within one another in a manner that corresponds to a desired hierarchy. For instance, FIG. 2 illustrates an example of folders that represent a browser hierarchy entitled "Market". The first level under the main browser category heading contains three items, namely "Business", "Education" and "Home". The Home category contains a further sublevel comprising the "Family" and "Home Office" categories.

To construct this browser hierarchy, the user first creates an empty folder labeled "Market". Within this folder, the user then creates three folders respectively labeled "Business", "Education" and "Home". The "Home" folder contains two further folders labeled "Family" and "Home Office". Once the folder hierarchy has been completed, the highest level folder, in this case the "Market" folder, is imported into the information retrieval system, to create a corresponding dimension file. The importation of the folder hierarchy into the system might be carried out by means of a suitable command on the user interface, for example. In response to the selection of such a command, the information retrieval system examines the hierarchical structure of the folders, and creates a dimension file which defines this structure.

The dimension files contain terms which characterize content to be gathered within the hierarchies. For the particular example depicted in FIG. 2, the dimension file contains a list of terms that correspond to the names given to the folders ("business", "education," etc.), in a manner that identifies their hierarchical relationship to one another. These are the terms that are used by the search engine to construct queries for the information retrieval process, as described below.

Figure 3:
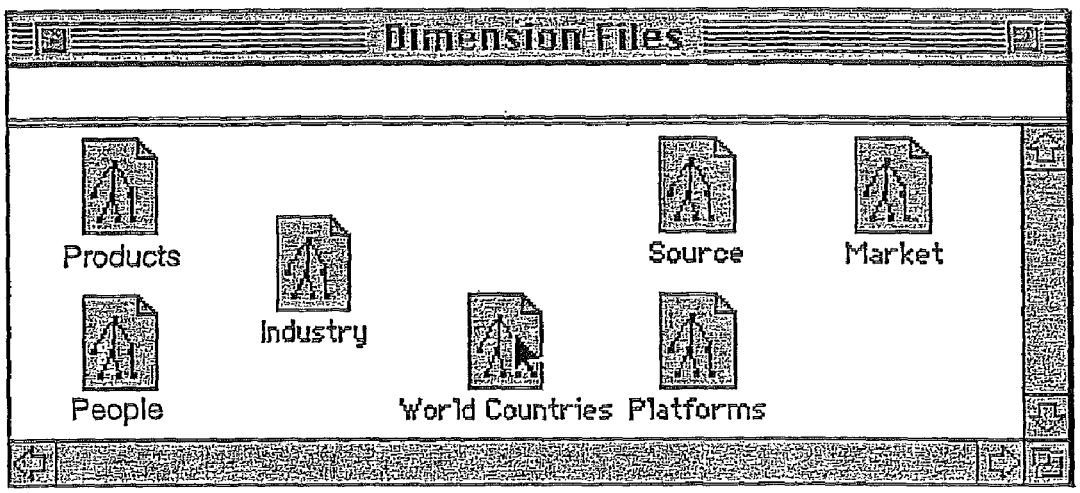
FIG. 3 is an illustration of a window containing a number of dimension files.

The "Market" dimension file represents one approach that the user employs to categorize information. In a similar manner, other dimension files are created by the user to represent other approaches to information content that are intuitive to that user. FIG. 3 illustrates an example of various dimension files that may have been established by a given user to search for information of interest.

One of the significant advantages of the dimension files is that they are created independently of any particular source of information. This feature enables them to be portable, so that their inherent structure can be applied to information from a variety of different sources. As a result, the user can carry the client application 10 and the dimension files 12 to any suitable information source, e.g., a library, and use them to search documents in a manner that is comfortable to that user. Furthermore, because of their portability, the dimension file can be shared by several users, and distributed to all the members of a group or enterprise.

In the operation of the system, the terms at the various levels of the hierarchy are used to construct queries upon which the search system 14 operates to retrieve relevant documents from selected information sources. More particularly, the terms that the user employs in constructing the browser hierarchy, e.g., the names of the folders, form components of the query. The actual terms which are used in the query are dependent upon a level within the hierarchy that is selected by the user. If the user selects the lowest level in the hierarchy, only the term associated with that level is employed in the query. Conversely, if the user selects the highest level in the hierarchy, each of the terms in that selected level and all levels below it are employed in the search query. For instance, all of the terms can be joined with boolean "OR" operators, to retrieve all documents that contain any of the teems in the selected level and all dependent levels of the browser hierarchy. This operation is explained in greater detail hereinafter with reference to specific examples that are illustrated in FIGS. 4-7.

Figure 4:
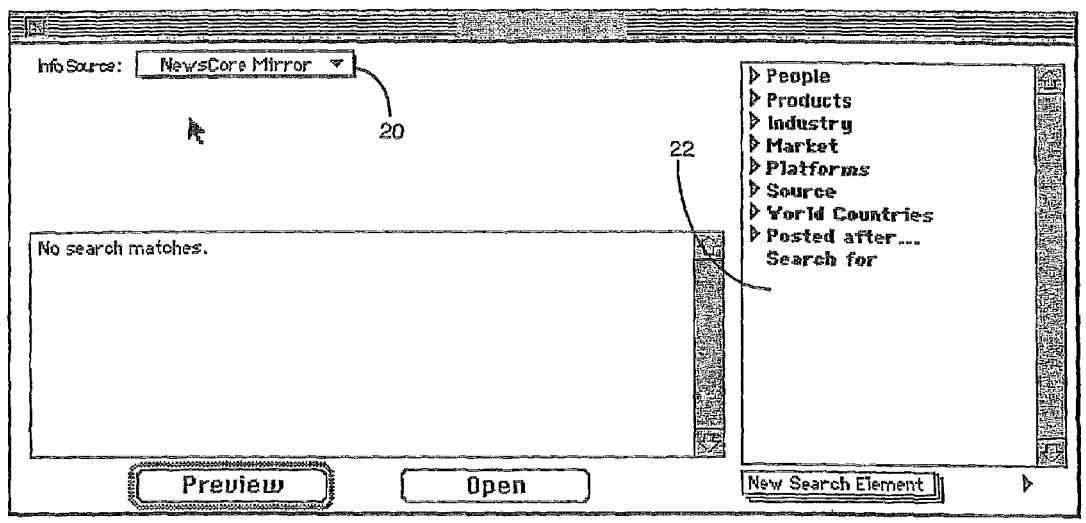
FIGS. 4-7 illustrate examples of the user interface and search results provided to a user during information retrieval sessions.

FIG. 4 is an illustration of the user interface that is initially provided to the user when the client application 10 is opened. The upper left portion of this interface contains a pop-up menu 20 via which the user can select the information sources that are to be searched. In this particular example, the user has selected an information source entitled "NewsCore Mirror". Although this particular example illustrates a single information source, the user can select any number of information sources to be searched during a given session.

Once the user has selected the appropriate information sources, the hierarchical browsers to be used in the searching of those information sources are selected. The available browsers, which correspond to the dimension files, are listed in a window pane 22 on the right side of the interface. It can be seen that these browsers correspond to the dimension files illustrated in FIG. 3. In addition to the dimension files that were created by users, a "date" browser is added to the user-specified list. This browser provides a list of dates in both relative form (e.g. 1 week ago, 1 month ago, etc.) and in absolute form.

Figure 5:
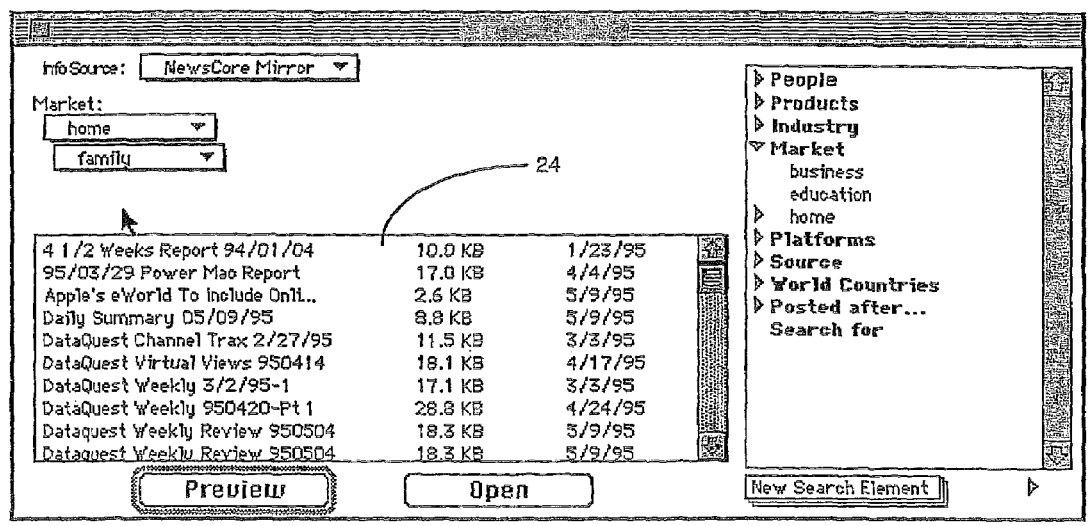

The window pane 22 includes a suitable arrow button, or other equivalent form of control element, which permits the user to view the various levels of each browser hierarchy. FIG. 5 illustrates an example in which the user has activated the button for the "Market" hierarchy, thereby causing the next level of components in that browser to be displayed in the window pane 22. The activation of this button also causes the "Market" browser to be selected for use in the search. This selection is indicated on the left side of the interface, under the information source. In the particular example of FIG. 5, within the "Market" browser, the user has further selected the subcategory for the home market, and then further specified the family market.

Once these selections have been made by the user, the documents within the chosen information source(s) which correspond to the browser selections are displayed in a search results window pane 24. These documents are selected by means of a query which is presented to the search and indexing system 14. Referring to the hierarchy illustrated in FIG. 2, the particular browser level chosen by the user, i.e. "Family", is at the lowest level of its corresponding branch of the hierarchy. In this case, the query that is presented to the search and indexing system 14 comprises the term at this level. In other words, the search and indexing system conducts a search of the information source for all documents that contain, or otherwise relate to, the term "Family". These documents are then displayed in the search results window pane 24. In addition to the titles of the documents, any other information that may be useful to the user can be displayed in the search results pane, such as size, date, etc. From this list, the user can select any individual document and review it in a separate window, in a known manner.

The user can expand the search by selecting a higher level within the browser hierarchy. For example, if the user moves up one level to select the "Home" category, the search and indexing system 14 then institutes a search for all documents which contain, or relate to, the word "Home", as well as the terms which appear in all lower levels of the hierarchy that depend from the "Home" level. In this particular case, the search and indexing system 14 would locate documents that relate to the terms "Home", "Family" and "Home Office". By means of this approach, it can be seen that the present invention provides an information retrieval system which enables the user to institute a targeted search, by selecting a particular level within the browser, but also provides the flexibility to locate related documents according to the hierarchical structure of the browser, simply by moving to different levels. The browser interface provides the user with a convenient mechanism to expand or contract the search query, while remaining within the context originally established by the browser hierarchy.

If the search results did not identify the particular types of documents the user was looking for, or if the user simply desires to take a different approach to searching the documents, it is possible to switch to a different browser from among those which are available. In this manner, the same source of information can be viewed from a variety of different perspectives.

Figure 6:
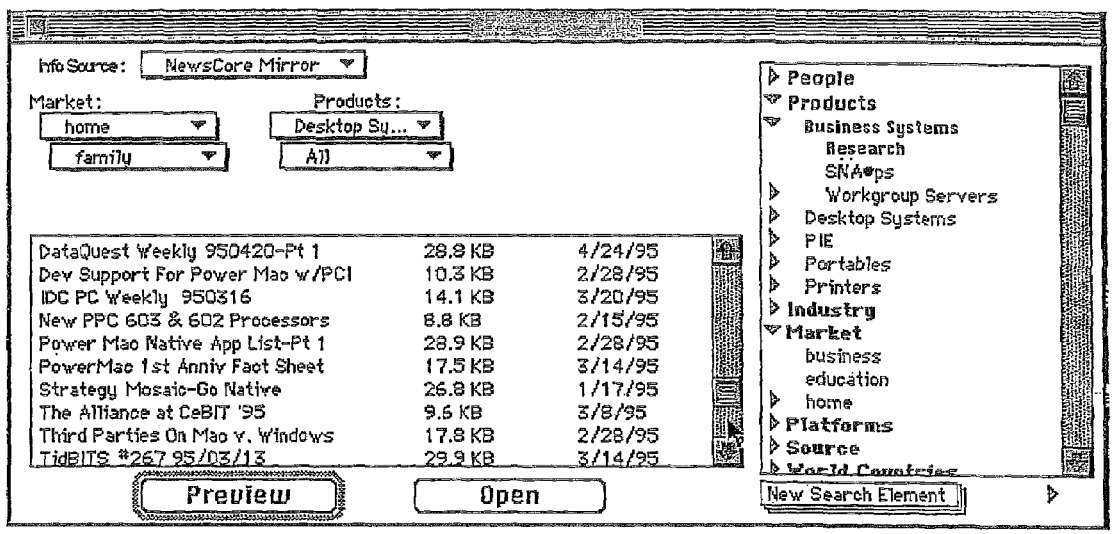

To further refine the search results, the user can combine multiple browsers which organize the information in different manners. For instance, FIG. 6 illustrates an example in which the user has selected a second browser entitled "Products". In this case, the documents appearing in the window pane 24 are limited to those which meet the criteria set forth by the selected level of both browsers. In other words, the search and indexing system 14 performs a boolean "AND" operation on the query terms provided by the respective browsers. By selecting multiple browsers in this manner, complex and specific search criteria can be generated without requiring the user to know how to construct boolean searches or to be familiar with the vocabulary of the particular document collection that is being searched.

Figure 7:
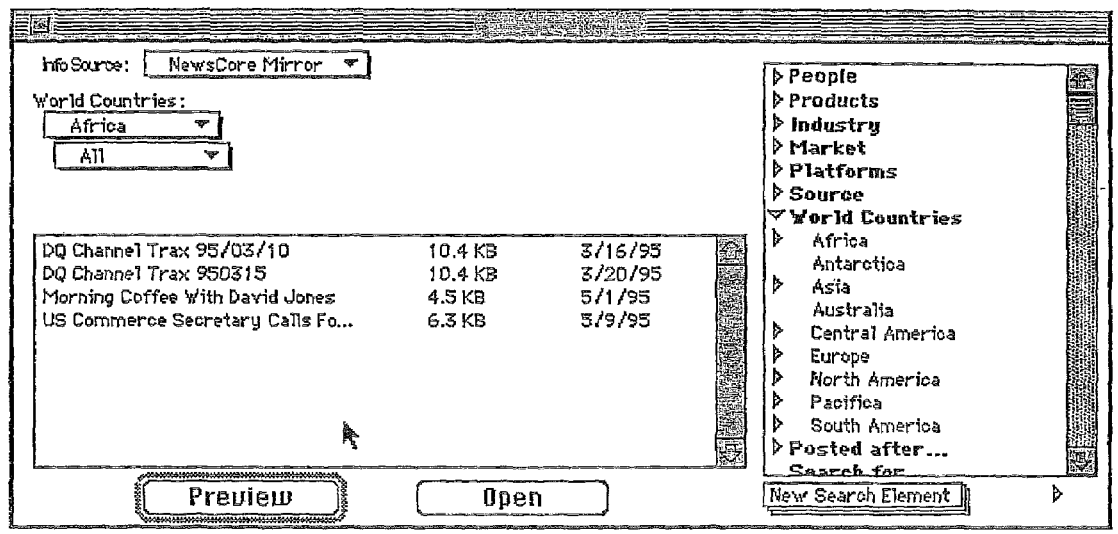

In the example of FIG. 6, the user has selected the "All" category within the Products browser. This selection indicates that every subcategory within the "Desktop Systems" category is to be included within the browsing criteria. Thus, the browsing hierarchies that are employed in the context of the present invention are true hierarchies, in the sense that the selection of any given level within a hierarchy causes all points beneath that selected level to be contained within the search specification. For instance, FIG. 7 illustrates an example in which the user has chosen to include all African countries in the search specification, rather than specifying one or more particular countries.

Figure 8:
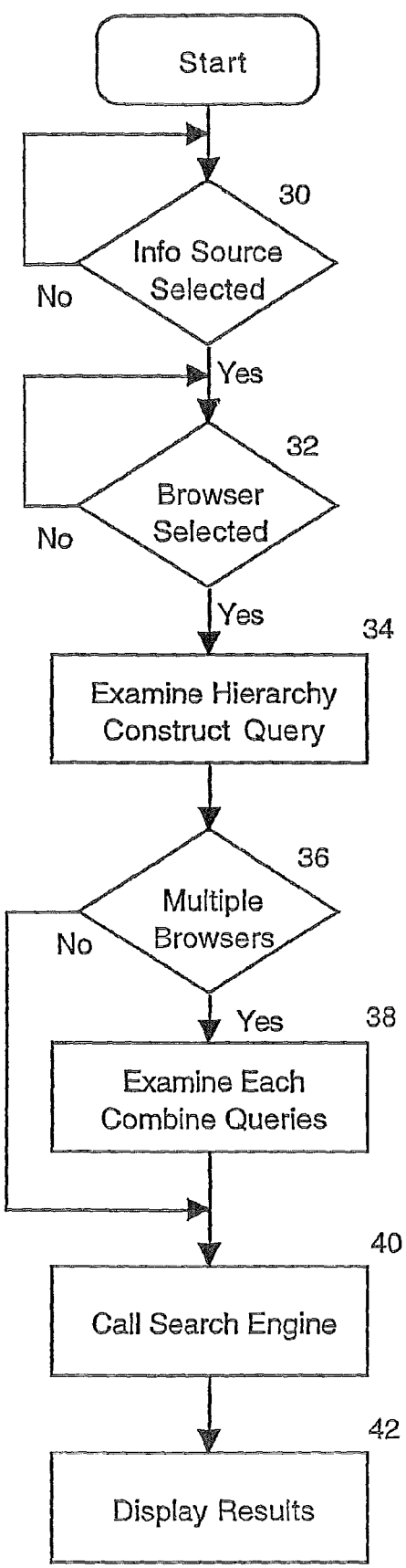
FIG. 8 is a flow chart illustrating the basic operation of the information retrieval system of the present invention.

To summarize the general operation of the information retrieval system of the present invention, a brief functional overview is provided in the flow chart of FIG. 8. Once the information retrieval system is activated, it first awaits selection of one or more information sources by the user, at step 30. After the user has selected the information source(s), the system looks for a selection of an available browser hierarchy, at step 32. Once a hierarchy, and more specifically a particular level within the hierarchy has been selected, the system examines the hierarchy at step 34 and constructs a query of the terms contained at the selected level of the hierarchy and all lower levels which depend from it. These various terms are connected by means of boolean "OR" operators. At step 36, a determination is made whether multiple browsers have been selected. If so, each browser is examined to construct a query, as in step 34, and the queries from all of the browsers are then combined by means of boolean "AND" operators at step 38. Once the construction of the query in this manner has been completed, the search engine 14 is called at step 40, and the query is provided to it. If needed, the search engine is also informed of the information source(s) to be searched with that query. After the search is completed, the search engine returns the results to the client application 10, and they are displayed hi the window pane 24, at step 42.

To further enhance the user's experience of browsing a document collection, as opposed to executing a targeted search, the information retrieval system can analyze a selected document to identify branches of the browsing hierarchy with which that document is most closely associated. This feature of the invention is explained with reference to the exemplary hierarchy illustrated in FIG. 9. In this particular example, the user has selected a browser hierarchy, or a level within a hierarchy, that relates to handheld computing products. The first sublevel contains two entries, namely "Palmtop Computers" and "Pocket Devices". Each of these two subcategories contains further subsidiary levels, as shown.

Figure 9:
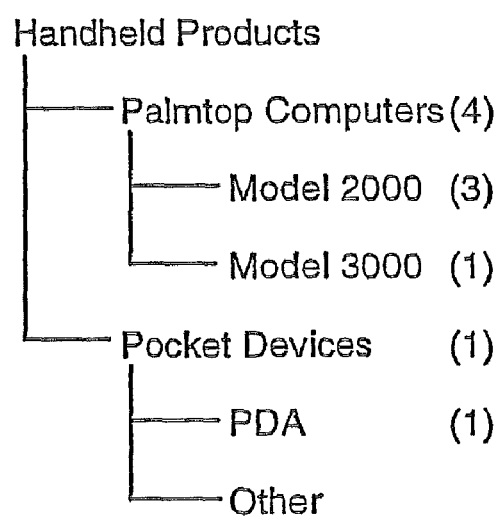
FIG. 9 is an exemplary hierarchy which illustrates the relevance feedback feature of the invention.

Once a search is conducted in accordance with the selected level of the browser hierarchy and the search results are displayed, the user can select one of the documents in the displayed results. The contents of that given document are examined, to determine how many times each of the terms in the relevant hierarchy appear within the document. In effect, a reverse indexing approach is employed, in which the words in the document are compared against the terms in the browser hierarchy, to determine which of those terms appears most frequently. In the example of FIG. 9, the number of times each term appears in a selected document is indicated in parentheses. Thus, the term "Model 2000" appeared three times, and the terms "Model 3000" and "PDA" each appeared once. For each level of the hierarchy above the lowest level, the values for each of its dependent levels are summed. In the illustrated example, therefore, the category "Palmtop Computers" is given a value of 4, and the category "Pocket Device" has a value of 1.

The values that are associated with the levels in the hierarchy identify the concepts in the hierarchy that are most frequently mentioned in the selected document. These values can be displayed on the interface, to provide feedback to the user on the type of relevance associated with the document. From this information, the user can modify the selection within the browser hierarchy. For instance, in the example of FIG. 9, the user might change the selection from the more general "Handheld Products" category to the more specific "Palmtop Computers" category. As a result of this change, the user is provided with the capability to more easily browse other documents that are nearby, or more closely related to, the selected document.

As an alternative, rather than display the results that are obtained through this analysis, the client application could automatically reposition the browsing hierarchy to the location that most closely corresponds to the selected document's location, as indicated by the computed values.

From the foregoing, it can be seen that the present invention provides an information retrieval system that allows users to employ any knowledge that they may have about the information they are looking for to construct a cognitive framework within which to locate that information. This framework, in the form of browser hierarchies, is independent of the actual information to be searched, and therefore can be readily distributed to various users and applied to different sources of information as desired. Furthermore, the user has the continual ability to switch among alternative browsers, combine multiple browsers, and create additional contextual hierarchies, to fit any particular situation. By using these hierarchies to locate potentially relevant documents, the user is able to browse in spaces around those documents that are organized in accordance with the cognitive framework established by the user.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An information retrieval system, comprising:
   a plurality of files stored in memory, each defining a different hierarchical relationships of terms describing an organizational framework for information;
   a user interface which permits a user to select a level within each of at least two of the different hierarchical relationships;
   a search query generator responsive to the selection of the level within each of the at least two different hierarchical relationships to construct individual search queries of terms that are based upon the selected levels, and combine the individual search queries of terms to form a search query that is provided to a search engine, wherein the search engine searches a source of information to locate documents which correspond to the search query; and
   a display which displays information about the located documents to the user.

2. The information retrieval system of claim 1, wherein at least one of the individual search queries contains the term at the selected level of the hierarchical relationship and terms from lower levels of the hierarchical relationship which depend from the selected level.

3. The information retrieval system of claim 2, wherein the terms are combined by boolean "OR" operators to form the at least one of the individual search queries.

4. The information retrieval system of claim 1, wherein the user interface permits the user to select one or more sources of information to be searched.

5. The information retrieval system of claim 1, wherein the individual search queries are combined by boolean "AND" operators to form the search query.

6. The information retrieval system of claim 1, wherein the display displays values which identify the relevance of a document to levels in the selected hierarchies, in accordance with information provided by the search engine that is based upon analysis of the document among the located documents to determine which of the terms in a hierarchy said document most closely relates to.

7. The information retrieval system of claim 6, wherein the user interface automatically selects a level within the hierarchy in accordance with the analysis of a selected document.

8. A method for locating documents within a source of information, comprising the steps of:
   defining, in a computer, a plurality of different hierarchical relationships of terms describing an organizational framework for information;
   selecting, in a user interface, a level within each of at least two of the different hierarchical relationships;
   constructing, in a search query generator responsive to the selection of the level within each of the at least two different hierarchical relationships, individual search queries of terms that are based upon the selected levels, and combining the individual search queries of terms to form a search query that is provided to a search engine;
   searching, by the search engine, a source of information to locate documents which correspond to the search query; and
   displaying, on a display, information about the located documents to the user.

9. The method of claim 8, wherein at least one of the individual search queries contains the term at the selected level of the hierarchical relationship and terms from lower levels of the hierarchical relationship which depend from the selected level.

10. The method of claim 9, wherein the terms are combined by boolean "OR" operators to form the at least one of the individual search queries.

11. The method of claim 8, wherein the user interface permits the user to select one or more sources of information to be searched.

12. The method of claim 8, wherein the individual search queries are combined by boolean "AND" operators to form the search query.

13. The method of claim 8, further including the step of analyzing a selected document among the located documents to determine which of the terms in a hierarchy said selected document most closely relates to.

14. The method of claim 13, further including the step of displaying values which identify the relevance of the selected document to levels in the selected hierarchy.

15. The method of claim 14, wherein the user interface automatically selects a level within the hierarchy in accordance with the analysis of a selected document.

16. A computer-readable recording medium storing a program which causes a computer to execute the steps of:

defining, in a computer, a plurality of different hierarchical relationships of terms describing an organizational framework for information;

selecting, in a user interface, a level within each of at least two of the different hierarchical relationships;

constructing, in a search query generator responsive to the selection of the level within each of the at least two different hierarchical relationships, individual search queries of terms that are based upon the selected levels, and combining the individual search queries of terms to form a search query that is provided to a search engine;

searching, by the search engine, a source of information to locate documents which correspond to the search query; and displaying, on a display, information about the located documents to the user.

17. The computer-readable recording medium of claim 16, wherein at least one of the individual search queries contains the term at the selected level of the hierarchical relationship and terms from lower levels of the hierarchical relationship which depend from the selected level.

18. The computer-readable recording medium of claim 17, wherein the terms are combined by boolean "OR" operators to form the at least one of the individual search queries.

19. The computer-readable recording medium of claim 16, wherein the user interface permits the user to select one or more sources of information to be searched.

20. The computer-readable recording medium of claim 16, wherein the individual search queries are combined by boolean "AND" operators to form the search query.

21. The computer-readable recording medium of claim 16, further including the step of analyzing a selected document among the located documents to determine which of the terms in a hierarchy said selected document most closely relates to.

22. The computer-readable recording medium of claim 21, further including the step of displaying values which identify the relevance of the selected document to levels in the selected hierarchy.

23. The computer-readable recording medium of claim 22, wherein the user interface automatically selects a level within the hierarchy in accordance with the analysis of a selected document.

* * * * *

UNITED STATES PATENT AND TRADEMARK OFFICE
CERTIFICATE OF CORRECTION

| | | |
|---|---|---|
| PATENT NO. | : 7,769,741 B2 | Page 1 of 1 |
| APPLICATION NO. | : 12/611252 | |
| DATED | : August 3, 2010 | |
| INVENTOR(S) | : Richard Daniel Borovoy et al. | |

It is certified that error appears in the above-identified patent and that said Letters Patent is hereby corrected as shown below:

In column 3, line 36, delete "preexisting" and insert -- pre-existing --, therefor.

In column 4, line 59, delete "teems" and insert -- terms --, therefor.

In column 6, line 57, delete "hi" and insert -- in --, therefor.

In column 10, line 17-20,
in claim 20, delete "20. The computer-readable recording medium of claim 16, wherein the individual
    search queries are combined by boolean "AND" operators
to form the search query." and
insert
-- 20. The computer-readable recording medium of claim 16,
wherein the individual search queries are combined by boolean "AND" operators to form the search query. --, therefor.

Signed and Sealed this
Twenty-second Day of November, 2011

David J. Kappos
*Director of the United States Patent and Trademark Office*